March 17, 1970     W. DEITERS     3,501,270
REDUCTION OF ALKALI SULFATES TO CAUSTIC
ALKALI WITH CRACKABLE GASES
Filed June 14, 1967
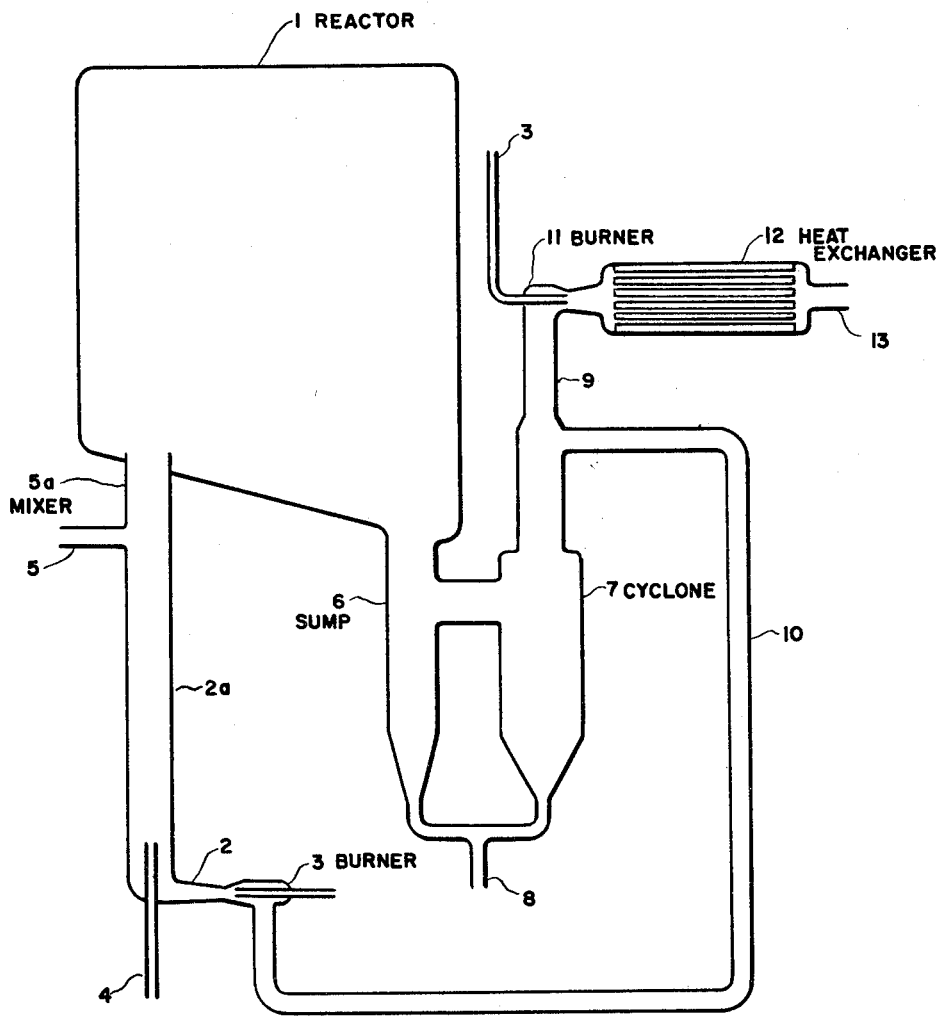
INVENTOR.
WILHELM DEITERS
BY

3,501,270
REDUCTION OF ALKALI SULFATES TO CAUSTIC ALKALI WITH CRACKABLE GASES
Wilhelm Deiters, Chur, Grison, Switzerland, assignor to Inventa A.G. für Forschung und Patentverwertung, Zurich, Switzerland
Filed June 14, 1967, Ser. No. 645,909
Claims priority, application Switzerland, June 17, 1966, 8,826/66
Int. Cl. C01d 1/04
U.S. Cl. 23—184          9 Claims

ABSTRACT OF THE DISCLOSURE

A process for the production of caustic alkali from alkali sulfate solutions with crackable gases and steam. The gases are burned, and the cracked components furnish the heat supply needed for the process. The contact of the caustic alkali with higher concentrations of $CO_2$ simultaneously is prevented, so that a substantially pure end product is obtained.

---

The process for the reduction of alkali sulfates, e.g., sodium sulfate, with formation of sulfide, hydroxide or carbonate, has been known since the time of Leblanc and has been subjected to many modifications ever since. The oldest methods used coal as a reducing agent (Ber. 10, (1877) 1976; Compt. ren. 149, (1909) 1076; Chemiker Zeitung 46, (1922) 633). These methods were modified and as such employed melts, shaft furnaces, catalysts, etc. Further, these methods were also modified to be continuous processes. Still, these variations do not meet the increasing demands of modern industry. This is because the requirement for coal and the ensuing need for working off the carbonates obtained, renders the process uneconomical and further because the use of a solid reducing agent is a hindrance in continuous processes.

Extensive research has been carried out on the subject of the sulfate reduction with coal, especially with regard to the production of sodium sulfide, by Budnikoff (Angewandte Chemie 39, 1398, (1926); Z. anorg. Chemie 170, (1928) 225; and others). The action of carbon monoxide is treated therein incidentally. Budnikoff also speculates on the use of mazout, fuel oils, crude oil, pitch and tar for forming the required briquettes.

The use of gaseous reducing agents, such as $H_2$, CO and $H_2S$ has also been suggested (Compt. ren. 110 (1890), 1106; Chem. Met. Eng. 19 (1918), 709; etc.). Furthermore, a variety of mixed gases has been discussed. For example, producer gas, fuel gas, mixed gases, and such as semi-water gas, water gas, illuminating gas, and others. These gases can be manufactured outside the reducing device and introduced into the reactor. They also can be generated in the reactor itself. As described in German Patents 123,862 and 125,986, a mixture of sodium sulfate with coke is exposed directly to the water gas process whereby, under subsequent action of air and steam, high heat is produced by the ensuing formation of producer gas and steam-splitting by water gas. However, it is also possible to manufacture producer gas directly from air and steam and to use this as the reducing agent.

A treatise of the Moscow Energy Institute (Chem. Ind. Moscow 41, No. 12, 18 (1965) on the reduction of sulfate to sulfide by means of natural gas contains valuable hints pertaining to the course of the reaction. It had been found that a mixture containing 90% sodium sulfide and 6% carbonate is obtained by conducting the gas over the sulfate melt in a boat. The gas had been converted with oxygen, and the dwelling time was 5 minutes at 1150° C.

Additionally, the introduction of steam has been found to have a good effect on the oxide formation. This has been well documented in the literature. The influence of steam on the intermediate products formed by numerous side and ensuing reactions has also been treated with. One of these is the production of alkali hydroxides by treating heated sulfate with a mixture of $H_2$ and steam. The influence of catalysts and of $CO_2$ has also been discussed.

The coal commonly used is bituminous coal. However, soft coal and carbonized wood flour can also be employed. In the prior art, very little is said about the use of hydrocarbons as reducing agents. On the contrary, the use of highly coked coal is preferred because allegedly the volatile hydrocarbons adversely affect the reaction. Also, difficulties are described which arise from side reactions occurring in the presence of hydrocarbons.

Some publications relate that the development of volatile gases upon the use of bituminous coal creates favorable reducing conditions (Chem. Met. Eng. 19, 709 (1918); J. Soc. Chem. Ind. A40, 548 (1921). Bitumen may be considered an intermediate between coal and hydrocarbons and has been used as a binder for anthracite briquettes for use in the alkali sulfate reduction. It has been observed that the reduction of sodium sulfate with coal in the presence of hydrocarbons leads to a conversion of the sodium sulfide to its hydroxide. However, this is ascribed to the formation of water.

The reduction of $SO_2$ with hydrocarbons over bauxite has shown that the speed of reaction at 900° C. is slower with methane than with $H_2$ and CO. However, the results become increasingly more favorable with an increase in the molecular weight of the hydrocarbons, for instance with benzene or with olefins, and useful results are obtained at 700–800° C. Similar results have been found for the reduction of gypsum.

In the aluminate production wherein alkali sulfates are reduced in the presence of alumina and steam, hydrocarbon vapors have been recommended as reducing agents in lieu of CO. The reduction of powdered sulfates, such as anhydrite, has been proposed. The powder is saturated with liquid hydrocarbons, then heated.

The manufacture of $Na_2S$ by reduction of $Na_2SO_4$ with gases is described by W. A. Nikitin and T. J. Kunin (Isvestiya Vysshich utshebnich Savedeniy 6, No. 2, 263–7 (1963). Experiments were conducted with gaseous hydrocarbons, but the reduction capabilities of the split products obtained by cracking in nascent state was insufficient due to the low temperatures employed.

A known procedure to make caustic alkali from alkali sulfate proceeds by way of the sulfide and the carbonate. The sulfide is produced with one of the reducing agents described above. It is treated with moist coal and then caustified with lime in a known manner. However, this is an involved procedure and is expensive.

It is an object of the invention to devise a continuous process for the manufacture of caustic alkali from alkali sulfate solutions. This is accomplished by atomizing by means of a burner a concentrated aqueous sulfate solution to obtain a mist. The mist is then exposed in the presence of steam, to the reducing action of a cracking gas at a temperature of 1,000 to 1,400° C. for approximately 60 to 180 seconds. The cracked components which burn during the reaction furnish the heat supply required for the process. Simultaneously, the contact of the caustic alkali formed with $CO_2$ in higher concentration is precluded so that contamination with appreciable amounts of carbonate is prevented.

The nature of the gas to be cracked during the process has a significant effect on the course of the reaction as well as on the economy of the process. In order to attain complete reaction of the sulfate, a quantity of oil is to be employed whose capability to split off hydrogenating cracking products exceeds the redox potential. The combustion of the hydrocarbons remaining after cracking furnishes the heat required for the process. Since the fissionability increases from paraffinic and aromatic toward naphthenic petroleum hydrocarbons and becomes more favorable with rising molecular weight, it is most advantageous to use a high-boiling naphthenic petroleum. Sulfur compounds present therein do not interfere with the reaction. Thus, a cheap crude oil can be employed.

High temperature is advantageous as it accelerates the course of the reaction. Cracking should occur in the presence of the highly heated sulfate melt because the fission products are most effective in the nascent state. This means that in order to obtain optimal results the process is steered in such a manner, that superheating of the evaporated oil takes place within the shortest possible time and in closest contact with the finely divided melt which is also in a superheated state. This is best accomplished by directly introducing a flame. Because the presence of a certain amount of water is required for the reaction, oxy-hydrogen blowers may be employed. However, a heating gas or, e.g., the reducing gas itself, suffices. In the simplest instance, the oil to be cracked can be injected into the burner with a strong deficit of air whereby the air is to be replaced completely or in part by oxygen, depending upon the reaction conditions.

To otbain high flame temperatures, oil vapor and air and also the required steam are preheated to high temperatures, e.g., to 600° C.

The invention now will be more fully explained with reference to the accompanying drawing and by an example. However, it should be understood that these are given merely by way of illustration, and not of limitation, and that it is intended to cover all modifications and variations which do not depart from the spirit and the scope of the invention as hereinafter claimed.

The drawing is a flowsheet in schematic form showing a device for carrying out the process according to the invention.

Referring now to the drawing, the sodium sulfate to be reacted and reduced is introduced into the voluminous reaction space 1 in the form of a finely divided suspension and is held therein for 1–3 minutes at high temperatures. During this time, the suspension is kept in turbulent movement and is contacted by cracking hydrocarbons which enter through the inlet 5. The reactor has an outer steel jacket (not shown) which is protected against corrosion in such a manner that a plurality of ceramic insulating layers in labyrinth formation dam up the heat flow on the inside. This causes the melt to solidify on the steel and form a protective layer. Heat is supplied by the combustion of the fission products. The fission products are conducted, after said combustion, to burner 2 by way of conduits 9 and 10.

The reaction occurs in the following three steps:

(1) The aqueous salt solution is introduced, by way of inlet 4, at approximately 100 atmospheres, into the flame of burner 2 after passing a preheater which heats it to approximately 300° C. In burner 2, the solution is atomized by the sudden evaporation of the water. The burner is fed with air, preheated to 500° C., which enters through pipe 3. A part of the hot fission gases also enters the burner through conduit 10. These gases have been previously freed of solids in cyclone 7.

(2) After a mist-like suspension has been generated at approximately 1,400–1,600° C. by evaporation of the water and melting of the sulfate in the flowing gas in burner pipe 2a (length approximately 3 m.), an excess of hydrocarbon vapors, preheated to approximately 600° C., is introduced through conduit 5 and mixed with the suspension in an efficient mixer 5a. The mixture then rapidly enters reaction space 1 (whose area is 20 m.$^3$), wherein it is subjected to turbulent motion and dwells therein, together with the melt particles to be reduced, until the reaction is complete. The required temperature of 1,200–1,400° C. in the well-insulated reactor is maintained by adjusting the quantities of hydrocarbon, heating gas and air.

(3) A part of the caustic alkali formed in reactor 1 separates in the sump 6 and can be removed therefrom through outlet 8. The gas leaving the reactor is freed from the remainder of the alkali entrained therein in cyclone 7. The gas is then removed through outlet 8. So much of the hot gas, is recycled, by way of conduit 10, to burner 2 as is required for atomization. The remainder of the gas is burned separately in burner 11, and its heat is distributed to preheaters for the several products by the heat exchanger 12. After complete cooling, $SO_2$ is isolated through line 13 in the conventional manner and can be catalytically oxidized to the trioxide and oleum.

EXAMPLE

A waste liquor, contaminated with residual hydrocarbons, from an organic synthesis and, containing 20 kg. $Na_2SO_4$ dissolved in 22 kg. water, is urged into a preheat coil by means of a pump at approximately 100 atmospheres and is preheated to approximately 300° C. This liquor enters the device described through inlet 4 and is atomized, by means of a nozzle, into the flame of burner 2. The burner is fed with a portion of the hot fission hydrocarbons entering through conduit 10 which have been generated in reactor 1 by oil cracking. The gases of the burner leave the burner pipe 2a at 1,400–1,600° C. and, prior to entry into reactor 1, are intimately mixed with 5.7 kg./hour fuel oil vapor, preheated to 600° C., in mixing device 5a. The fuel oil vapor enters through conduit 5. Due to the highly turbulent flow, the sulfate mist remains suspended in the reducing gases at 1,200–1,400° C. in reactor 1 for a time which is sufficiently long to insure its almost complete reaction. The solid and liquid particles are separated in sump 6 and cyclone 7. Then the fission gases are separated. The portion returning to burner 2 through conduit 10 is combusted with preheated air under pressure. The remainder is burned off in burner 11 and used to preheat the starting products (sulfate solution, oil and compressed air) in heat exchangers 12.

From the cracked gases together with 79 Nm.$^3$ moist air, 83 Nm.$^3$ gas are produced. 4.2/kg. $SO_3$ can be recovered therefrom and let-off through pipe 13. The crude caustic soda separated in 6 and 7 amounts to 5.58 kg./hour and contains 91 weight percent NaOH, 5.0 weight percent $Na_2CO_3$, 2.0 weight percent $Na_2S$ and 2.0 weight percent $Na_2SO_4$.

The term "Nm.$^3$" denotes cubic meters at normal atmospheric conditions.

I claim as my invention:

1. A process for the production of caustic alkali by the reduction of alkali sulfate which comprises forming a finely divided suspension from concentrated aqueous alkali sulfate solution at temperatures ranging substantially from 1,000 to 1,600° C. in the presence of steam by means of a flame; mixing said suspension with hydrocarbons which crack at said temperatures; keeping the mixture obtained at said temperatures while under the action of said cracked hydrocarbons in the nascent state until reduction is substantially complete; and recovering the caustic alkali thus produced.

2. The process as defined in claim 1, wherein the reduction time is 60 to 180 seconds.

3. The process as defined in claim 1, wherein said hydrocarbons are selected from the group consisting of paraffinic, aromatic and naphthenic petroleum crudes.

4. The process as defined in claim 1, wherein said hydrocarbons are present in an excess relative to their redox potential.

5. The process as defined in claim 1, wherein a portion of the cracked reducing gases is recycled to furnish the heat required for the process.

6. The process as defined in claim 5, wherein said gases furnish the entire heat required.

7. The process as defined in claim 5, wherein the portion of the gases not recycled first is freed from entrained caustic alkali; and inherent $SO_2$ then is recovered.

8. The process as defined in claim 7, wherein said gases, prior to the $SO_2$ recovery, are used for preheating the solution, hydrocarbons and air to sustain said flame.

9. A process for the production of caustic alkali by the reduction of alkali sulfate which comprises introducing a concentrated aqueous alkali solution, under pressure and preheated to substantially 300° C., into the flame of a burner; said flame being generated from compressed air, preheated to substantially 500° C., and gases stemming from the reduction; urging the sulfate solution, now in the form of a finely divided suspension and at a temperature of substantially 1,000 to 1,600° C., into a mixing device, therein contacting it with petroleum hydrocarbon, preheated to substantially 600° C., said hydrocarbon cracking at said temperatures; conducting the mixture thus obtained into a voluminous reaction zone at like temperatures for a dwelling time of substantially 60 to 180 seconds, thereby reducing said alkali sulfate to caustic alkali; removing the bulk of said caustic; conducting the cracked gases containing residual caustic and $SO_2$, into a cyclone, therein separating said residual caustic and recovering the same; recycling a portion of the cracked gases to said burner; burning the remainder of said gases in a second burner; conducting the combustion products to a heat exchanger which furnishes the heat required for preheating said solution, air and hydrocarbon; and then recovering $SO_2$ from said combustion products after passing through the heat exchanger.

References Cited

FOREIGN PATENTS 3,295 1869 Great Britain.

OTHER REFERENCES

Chemical Abstracts 31:2363 (1937).
Chemical Abstracts 28:4543 (1934).

OSCAR R. VERTIZ, Primary Examiner

G. T. OZAKI, Assistant Examiner

U.S. Cl. X.R.

23—177